United States Patent [19]

Aucoin, Jr.

[11] 4,352,990
[45] Oct. 5, 1982

[54] WATER POWERED ELECTRIC GENERATOR

[76] Inventor: Ano J. Aucoin, Jr., 213 Utah St., Morgan City, La. 70380

[21] Appl. No.: 243,199

[22] Filed: Mar. 12, 1981

[51] Int. Cl.³ ............................. F03B 7/00; F03B 9/00
[52] U.S. Cl. ........................................ 290/54; 415/5; 415/7; 416/85
[58] Field of Search .................. 290/43, 54; 415/5, 7; 416/85, 86

[56] References Cited
U.S. PATENT DOCUMENTS

| | | | |
|---|---|---|---|
| 981,514 | 1/1911 | Ames | 415/5 |
| 1,267,928 | 5/1918 | Speegle | 415/5 |
| 1,280,617 | 10/1918 | Watkins | 415/5 |

*Primary Examiner*—J. V. Truhe
*Assistant Examiner*—Shelley Wade

[57] ABSTRACT

An apparatus for efficiently converting the power of running water to useful electrical energy; the apparatus including a pair of floating pontoons anchored in a running stream, and between which a plurality of paddle wheels, rotated by the water, drive a gear mechanism connected to an electric generator, and ducts under the pontoons converging toward the paddle wheels, for concentrating more water flow thereto.

1 Claim, 5 Drawing Figures

U.S. Patent  Oct. 5, 1982  4,352,990
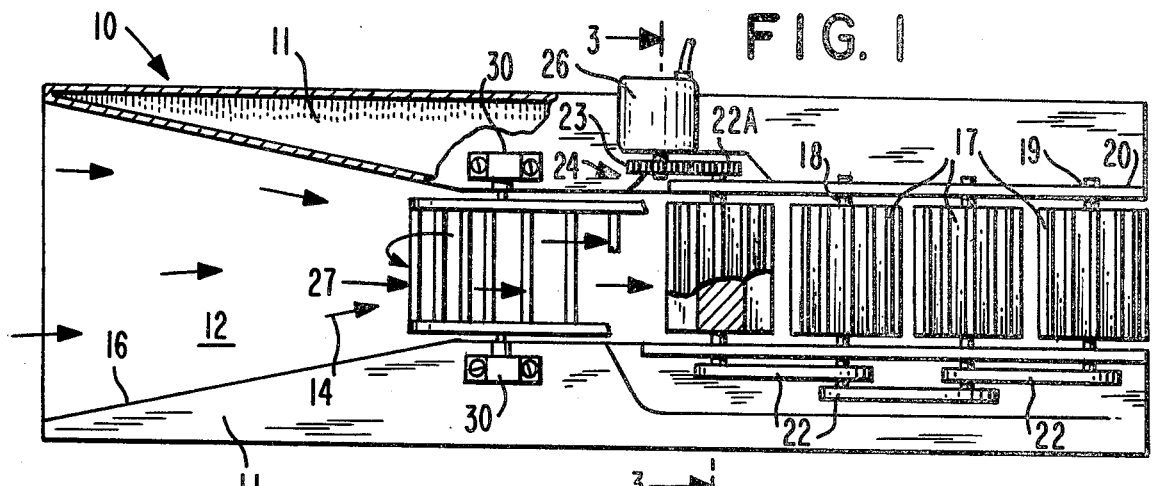
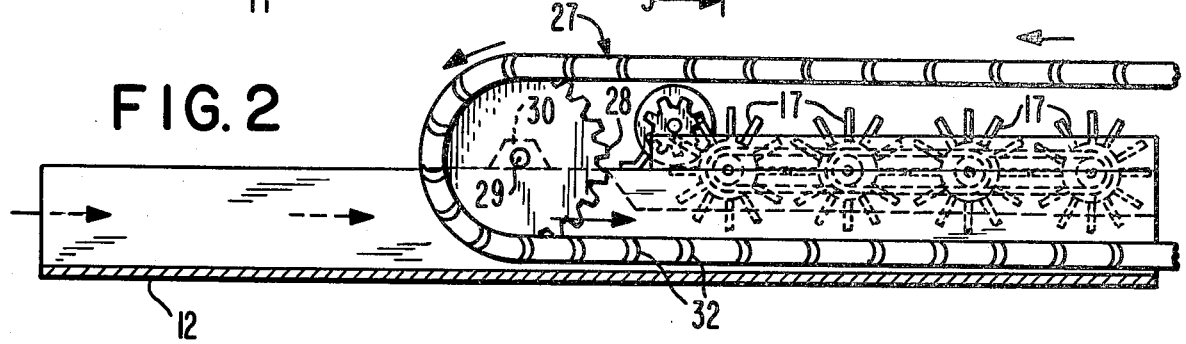
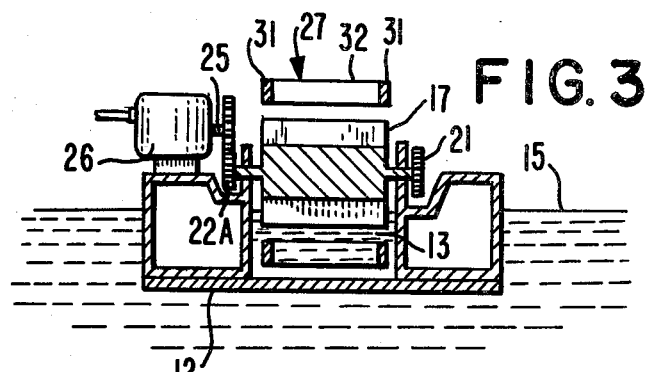
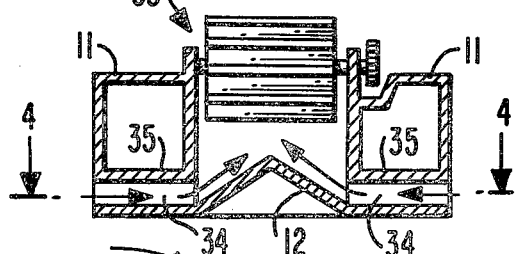
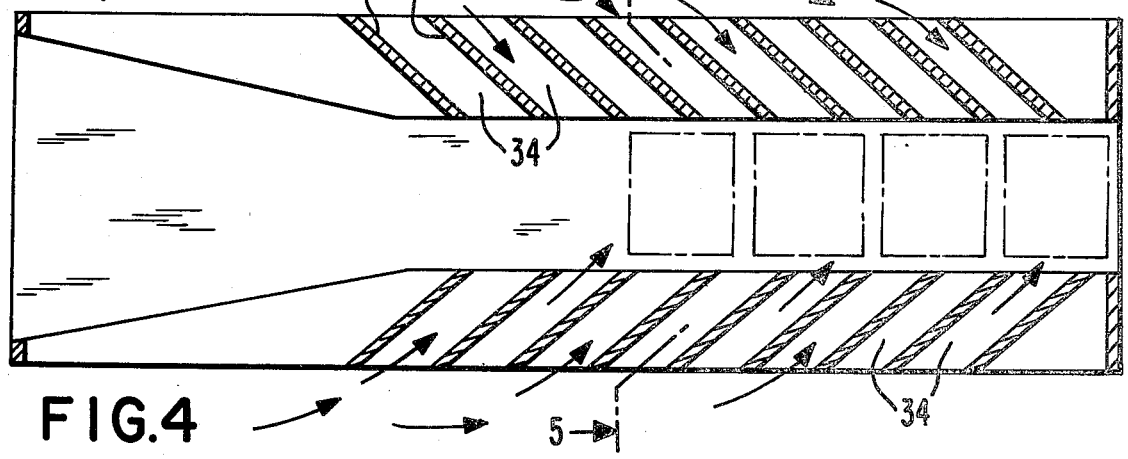

WATER POWERED ELECTRIC GENERATOR

This invention relates generally to water powered, electric generators.

It is well known, that numerous water powered, electric generators have been developed in the past, wherein the movement of water past a stationarily located mechanism causes the mechanism to operate, and thus drive the generator. However, such devices did not seem to include means for increasing the pressure and speed of the water, as it flows past the mechanism, as here presented by the applicant, so as to obtain a greater efficiency.

Accordingly, it is a principal object of the present invention to provide a water powered, electric generator in which the flowing water is concentrated, to flow through a converging channel formed between stationary pontoons, so that approximately twice as much water can flow therethrough, than if the water were left simply free-floating, so as to increase the pressure and speed of the water, and thus produce a stronger driving force for an increased electricity production.

Another object is to provide a water powered, electric generator, which may be stationarily anchored in any moving body of water, such as a stream or rushing river, or even an ocean tide, so that it may be made either on a small, or very large, scale, for handling the electricity power requirements of only a small number of persons, or else a large metropolis.

Other objects of the present invention are to provide a water powered, electric generator, which is simple in design, inexpensive to manufacture, rugged in construction, easy to use and efficient in operation.

These, and other objects, will be readily evident, upon a study of the following specification, and the accompanying drawing, wherein:

FIG. 1 is a top plan view of the invention, and showing one of the paddle wheels partly in cross-section;

FIG. 2 is a side view thereof;

FIG. 3 is an end cross-sectional view, on line 3—3 of FIG. 1;

FIG. 4 is a view similar to FIG. 3, and showing a modified form of the invention, in which water is, additionally, also pulled into the paddle wheel channel from along the outer sides of the pontoons, so as to obtain a still greater water pressure and more power, and FIG. 5 is a cross-sectional view, taken on line 5—5 of FIG. 4.

Referring now to the drawing in greater detail, and more particularly to FIGS. 1 through 3 thereof, at this time, the reference numeral 10 represents a water power system, according to the present invention, wherein a pair of elongated pontoons 11 are fixedly held apart, by means of a bottom wall 12, so as to form a channel 13 therebetween, through which water 14 flows, when the pontoons are stationarily anchored in any moving water body 15. A forward end of the pontoons are tapered, so as to form a gradually converging mouth 16, at the water-entering end of the channel.

A row of paddle wheels 17, supported between the pontoons, are rotated by the water 14 in the channel. The paddle wheels are affixed on shafts 18, journalled in bearings 19 of side walls 20, affixed upon the pontoons, so that the paddle wheels rotate about transverse axes to the water flow. Gears 21, affixed on the shafts 18, engage endless belts 22, so as to all rotate together, while another gear 22A, affixed on one of the shafts, engages a gear 23 of a transmission 24, affixed to a shaft 25 of an electric generator 26, installed on top of one of the pontoons.

Thus, in operative use, the water, flowing through the channel, causes the generator to turn, for producing electrical power.

As shown in the drawing, an endless belt 27 may also be included in the installation, for harnessing the water power further. This belt travels around spaced-apart large gears 28, on a shaft 29, journalled in bearings 30 on the two pontoons, each gear carrying an endless chain 31 of the belt. A plurality of spaced-apart, curved vanes 32 are supported between the chains. The belt 27 surrounds the above described assembly of paddle wheels, by running thereabove, and also therebelow, in a space between the paddle wheels and the bottom wall 12, so as also to be in the path of the water flowing in the channel. The space between the vanes 32 permits access of the water to the paddle wheels.

As shown, the pair of the gears 28 are, accordingly, at one end of the group of paddle wheels, the belt 27 travelling around another pair of gears (not shown), and which may be either upon the shore, or else on another like water power system 10, and which are connected to an electric generator.

A modified design of water power system 33, shown in FIGS. 4 and 5, may be the same as the system 10, except that it additionally includes angular ducts 34, under the pontoons, so as to cause water, from along an outer side of the pontoons, to enter the channel 13, for a still greater efficiency. In this design, the ducts are formed between V-shaped, bottom wall 12 and a bottom wall 35 of each pontoon, as well as a series of angular partitions 36. The V-shaped wall 12 thrusts the water up toward the paddle wheels.

While various changes may be made in the detail construction, it is understood that such changes will be within the spirit and scope of the present invention, as is defined by the appended claims.

What is claimed as new is:

1. A water power system, comprising, in combination, a pair of spaced-apart pontoons, for being stationarily anchored in a moving body of water, a channel thus being formed between said pontoons for a portion of said water to flow therethrough, a row of rotatable paddle wheels in said channel being affixed on shafts supported between said pontoons, so that said water turns said paddle wheels, and an electric generator driven by said paddle wheels; an endless belt surrounding all said row of paddles in spaced relation thereto, by extending above and below said paddle wheels, said endless belt comprising a pair of spaced-apart, endless chains and a plurality of curved vanes secured between said chains, a lower run of said belt being in said water of said channel, so as to move said belt, a plurality of gears beyond each end of said row of paddles, said belt chains being rotated around said gears, and an electric generator driven by said gears; a plurality of angular ducts between an underside of said pontoons and a bottom wall, and a portion of said bottom wall extending under said channel being upwardly inverted V-shaped, whereby said angular ducts and V-shaped bottom wall directs water from along an outer side of said pontoon toward said belt and paddles.

* * * * *